100 SLOTS – SPACING = $\frac{3\lambda}{4}$
EQUAL RADIATION / SLOT
L ≑ 51 yds. if λ = 480 Mc/s
L ≑ 8·2 " " λ = 3000 Mc/s

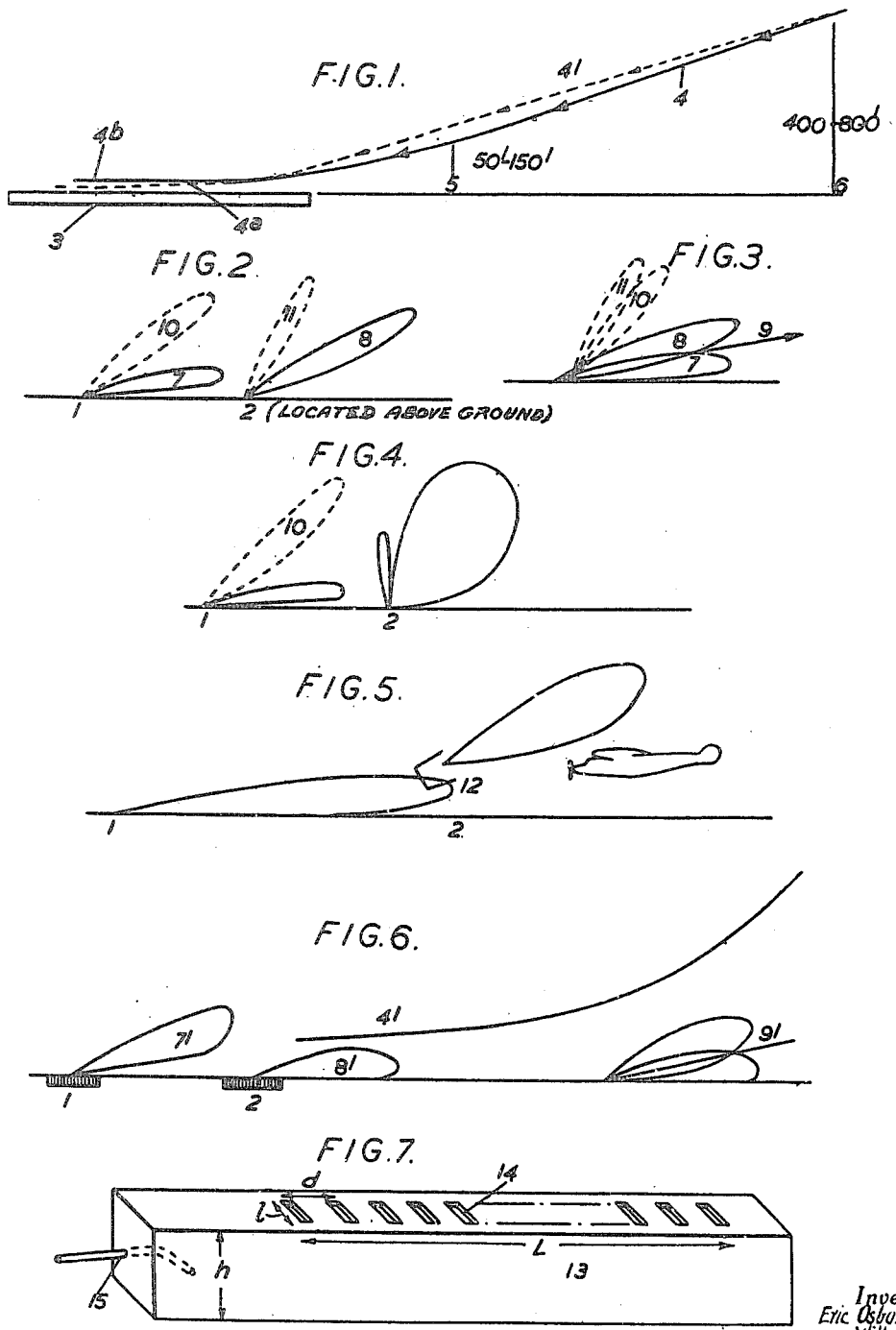

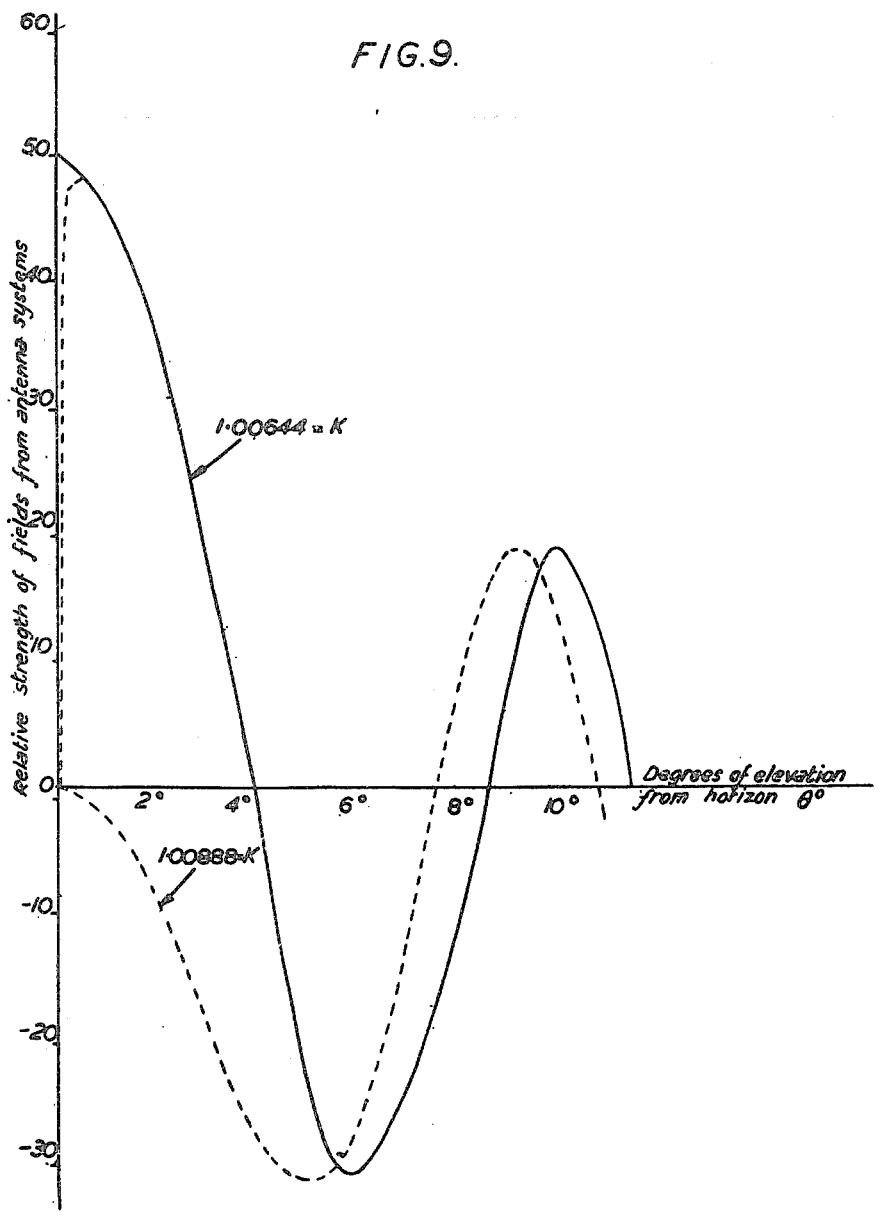

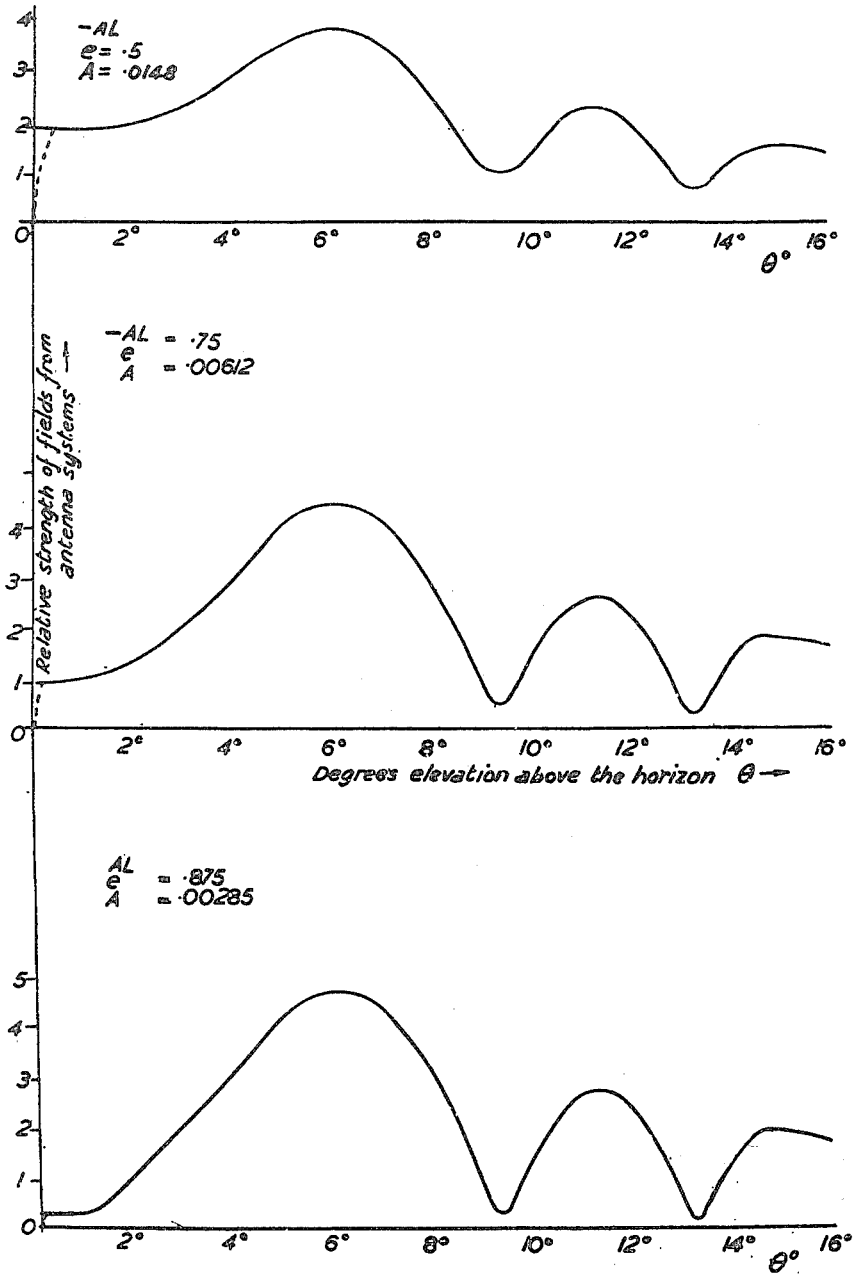

Patented Aug. 24, 1948

2,447,549

UNITED STATES PATENT OFFICE 2,447,549

RADIO GLIDE PATH LANDING SYSTEM FOR AIRCRAFT

Eric Osborne Willoughby, London, England, assignor to Standard Telephones and Cables Limited, London, England, a British company Application March 13, 1944, Serial No. 526,205
In Great Britain March 5, 1943

Section 1, Public Law 690, August 8, 1946
Patent expires March 5, 1963

12 Claims. (Cl. 343—108)

The present invention relates to radio glide path landing systems for aircraft of the kind in which the glide path is defined on the aircraft by a constant field or signal strength relationship of two field strength patterns overlapping in a vertical plane.

These field strength patterns must be identified in some manner or other and in some known systems the patterns are produced alternately in a keying rhythm, for example, dots and dashes, of the complementary signal or A-N type. Alternatively, the fields may each be identified by its respective identifying frequency modulation signal. In the former case the two fields may be produced by one or two antenna systems and in the latter case, usually by two antenna systems.

One difficulty in utilising systems employing overlapping field strength patterns is to produce a glide path which is linear at its initial portion from the commencement of descent of the aircraft, but which flattens out smoothly into the horizontal at the desired point of touch down of the aircraft on the runway.

An object of this invention is to provide a glide path landing antenna system which produces a curved glide path more closely approaching the natural descent curve of a well flown aeroplane than is produced by existing antenna systems.

Another object of the invention is to provide antenna systems which are suitable for defining the glide path but offer no obstructions on the runway to landing aircraft.

The path defined by the antenna system provided by this invention commences at remote points on the approach path at a preselected angle usually 3° to 4° and this smoothly becomes parallel to the ground at any selected touch down point on the runway and has an altitude at this point of touch down suited to the height of the aircraft aerial from the ground.

According to the invention in a radio glide path of the type hereinbefore specified the origins of both overlapping patterns are spaced apart in the direction of the glide path and said patterns are so shaped one with respect to the other that the path of constant field or signal strength relationship of the two overlapping patterns commences in a horizontal direction at a point in front of the said origins as regards the landing aircraft.

In carrying out the invention two antenna systems will be displaced from each other along the runway and may be located below the runway level, or may be above ground level and be offset laterally of the runway. Alternatively one antenna system, preferably the forward one, as regards the direction of the arriving aircraft, may be located below the level of the runway and the other antenna system above ground, offset or not from the runway. The distance between the two antenna systems may be such that the rear antenna system would not form an obstruction to the landing aircraft. The two systems will have directive lobes emanating from their respective locations.

Thus, with a system according to this invention, when the aircraft has touched down, it will continue forward and probably run past the first antenna system or the point where the lobes cease to overlap after which it will not continue to receive the signal from one of the systems, but only the signal from the other antenna system, thus advantageously giving the pilot an indication on the aircraft that he has passed the one antenna system.

The invention also comprises a construction of antenna system which will be described hereinafter which is suitable for locating below the level of the runway.

The invention will be made clearer in the following description of one embodiment thereof taken in conjunction with the accompanying drawings which include Figures 1 to 10.

In the drawings,

Figure 1 is a diagrammatic representation of the desired glide path, and the one usually obtained with existing systems, Figure 2 shows the relative positions of two antenna systems spaced along the runway, with their respective field distribution or radiation patterns, Figure 3 shows the radiation patterns of Figure 2 superimposed to show the effective field distributions at a distance from the antenna systems, Figure 4 shows preferred forms of radiation diagrams for the respective antenna systems, Figure 5 shows diagrammatically one antenna system at ground level and the other at the level of the aircraft receiving antenna when the aircraft is grounded, Figure 6 shows diagrammatically the arrangement of the two antenna systems located below the runway level, Figure 7 shows a wave guide antenna system, Figure 7b shows a modified wave guide antenna system, and Figures 8, 9 and 10 show field distribution diagrams which will be referred to more fully hereinafter.

In the following description it will be assumed than an equi-signal path, or path of equal field strengths is followed as the glide path.

It will be observed that the invention may be applied to existing systems of glide path antenna which are offset laterally of the runway, and which offer appreciable obstruction on the aerodrome, by spacing the two antenna systems in a direction parallel to the length of the runway with only minor modifications of the level and orientation of the antennae composing the systems. The invention may also be applied to modify a glide path system in which the antenna systems are spaced along the glide path but whose touch down point is between the two systems.

Referring to Figure 1 of the accompanying drawings, 4' and 4a represent the glide path of the type usually obtained; whilst 4 and 4b represent the desired glide path obtained by the present invention; 6 and 5 indicate the positions of the usual outer and inner marker beacons respectively; 3 indicates the runway.

Referring to Figure 2, 1 and 2 are antenna systems. If antenna system 1 has a radiation pattern in the vertical plane containing the glide path as indicated by the radiation lobes 7 and 10 (other lobes being omitted as irrelevant) and if antenna system 2 has a similar radiation pattern indicated by lobes 8 and 11, at a remote distance the glide path will be indicated by the straight line 9, which is the intersection of the two radiation diagrams as shown in Figure 3.

For Figure 3 to be strictly accurate, considering the radiation patterns individually they must be drawn to the same scale, that is, unit radius on the polar diagrams must represent the same field strengths at the same distances from the respective origins. Since the distance from the runway of the point at which the aircraft begins its descent is very large in comparison with the distance between the two antenna systems, at remote distances the locus of points of equisignal strengths on the two patterns, that is the points of intersection of the two patterns, coincides with a straight line 9 as shown in Figure 3. Assuming the aircraft to continue along the line 9 the ratio of the field strengths received from the forward antenna system and the rear antenna system increases as the aircraft approaches the antenna systems.

The glide path followed to maintain equi-signal relationship will be curved because of the inverse law of change of field intensity with distance and as the runway is approached the ratio of the field from antenna 2 to that from antenna 1 will increase.

Now a study of Figure 3 shows that the glide angle represented by the line 9 is lowered if the power radiated from antenna 2 (lobe 8) is increased relative to that of antenna 1 (lobe 7).

From this it follows that since the ratio of the field strength from antenna 2 to that from antenna 1 increases, the glide angle decreases continuously to give a tangential contact with the runway at a point just in front of antenna 2. This will theoretically be the point where the two patterns intersect near the antenna 2. The actual distance in practice of the point of contact of the aircraft from antenna 2 increases with the differences in height between antenna 2 and the receiving aerial on the plane when on the ground. When these are equal, the touch down point at which the wheels of the aircraft touch the ground lies in the same vertical plane as the theoretical point where the two patterns intersect, the receiving antenna of the aircraft then passing through this point.

It is essential in this case that the forward antenna 2 has a field which decreases with the decrease of glide angle and that of antenna 1 should preferably increase with the decrease of glide angle as this provides more gradual change of glide angle as the runway is approached.

It is important to note that there are three factors controlling the shape of the glide path, namely:

1. The shape of the radiation diagrams of the two antenna systems 1 and 2.
2. The ratio of the powers fed to the two antenna systems.
3. The spacing between the two antenna systems measured along the runway.

Referring to Figure 4, this shows a better shape of radiation diagram than that of Figure 2 or for "smothering" false glide paths. It is a common feature of ultra-short wave antenna systems of the type which produce a narrow beam such as that shown by lobe 7 of the radiation pattern of antenna 1, to have a number of adjacent unwanted lobes such as 10, and these when intersecting a lobe such as 11 of antenna 2 may produce a false glide path. Although the crossing of the outer and inner marker beacons at the correct heights is a protection against using a false path, it is preferable to have a system for antenna 2 with a radiation pattern such as that shown in Figure 4.

The practical solution of the curved glide path involves taking into account the height of the receiving aerial of the aircraft above the ground when the aircraft has touched down, and the height of the antenna system 2 above the ground.

The system described above with the lobe arrangement as shown in Figures 2, 3 and 4 is the case of the antenna system 2 mounted above the ground at the height of the same order as that of the receiving aerial in the grounded aircraft.

Figure 5 illustrates this, in which 12 is, for example, a parabolic reflector and linear antenna arrangement or a horn type antenna raised above the ground so that its radiation node is parallel to the ground and at the same height as the aerial on the plane at touch down.

If, on the other hand, antenna systems flush with the ground are used as shown in Figure 6, the characteristics of radiation patterns of antenna 1 and 2, shown in Figure 2 must be interchanged so that the path of constant field or signal strength is above the straight line path such as 9 Figure 3, whereas the previous case of Figures 2 to 5 the path of equisignal strength is below the line 9.

It is pointed out that the touch down point in both cases is in front of the antenna systems, but in the case of Figure 6 it is generally somewhat closer to the forward antenna system shown in the case of Figures 2 and 5.

In the case of Figure 6 the spacing between antenna systems 1 and 2, and their relative strengths of their radiated powers must be so adjusted that the flat portion 4' of the glide path is at the correct distance above the ground.

An antenna system in the ground surface is necessary if the glide path system is to be free from all obstructions. A suitable system is provided by a leaky wave guide which provides an endfire antenna system whose diagram can be controlled by the phase velocity along the guide. Such a guide is shown in Figure 7 and comprises a length of rectangular guide 13 provided with a plurality of apertures 14 spaced along its length and through which radiation takes place. The guide is excited by means of an antenna 15 at the end of the guide. In the case shown the antenna 15 is linear and placed horizontally, and the apertures are transverse slots.

It is simplest to consider the uniform distribution of energy radiated along the length of the guide-antenna system. In this case the field strength (F) is of the type:

$$F = \frac{CI}{D} \cdot \frac{\sin\left[\frac{\pi L}{\lambda}(K - \cos\theta)\right]}{\frac{\pi}{\lambda}(K - \cos\theta)} \quad (1)$$

Where
I is the radiation per unit length of the system and K is a factor representing the phase velocity of the waves in the guide compared to velocity in free space.
C is a constant,
D is distance from antenna system,
L is the length of the radiating portion,
$\lambda$ is the operating wave length,
$\theta$ is the polar angle measured from the horizontal.

A suitable construction of the guide is one having slots 14 spaced at regular intervals along one wall of the wave guide, particularly if longer wave lengths, i. e. 50 cm. or more are to be used. The radiation pattern then takes the form:

$$F = \frac{C_1 I \sin\frac{(n+1)d}{\lambda}(K - \cos\theta)}{D \sin\frac{\pi d}{\lambda}(K - \cos\theta)} \quad (2)$$

where $d$ is the spacing between slots 14, $C_1$ is a constant with zeros given by $$\cos\theta = K - \frac{\lambda}{(n+1)d}, K - \frac{2\lambda}{(n+1)d}, \text{etc.} \quad (3)$$

where $n$ is the number of slots.

Study of these formulae shows that to obtain low values of $\theta$ necessary for glide path and at the same time have high radiation intensity along these lobes, it is necessary to use the values of K which are very close to 1, and this means large wave guide depths $h$ if a uniform distribution is to be used (i. e. a longitudinal continuous slot in the side of the wave guide which is perpendicular to the electrostatic field within the guide, and which forms the upper face of the antenna system). Also the very critical effects due to small changes in K make it essential that the wave guide system should be free from water.

However, by the use of slots the phase velocity can now be adjusted so that an extra phase advance of $2\pi$, or any integral multiple thereof is added between slots. This corresponds to a much greater phase velocity than that corresponding to the value of K given according to Formula 2 and hence although the radiation pattern is unaltered the guide dimensions are enormously reduced. In order to produce large strength and low radiation lobes, the wave propagation velocity inside the guide must be such as to produce a phase difference between adjacent slots corresponding to a phase velocity greater than that of free propagation in air. The slot spacing is selected to give a good front to back radiation ratio. The depth of the guide may then be chosen to have a suitable wave propagation velocity.

From a practical point of view if a guide is end fed and all slots are of the same size there will be a tendency for damping and analysis shows that if instead of uniform radiation per unit length there is a decrement along the wave guide so that the radiation per slot takes the form $I e^{-Ax}$, where A is a constant and $x$ the length from the antenna end of the guide, the total radiation is of the form:

$$F = \frac{CI}{D} \frac{\left(1 - 2e^{-AL}\cos\left[\frac{2\pi L}{\lambda}(K - \cos\theta)\right] + e^{-2AL}\right)}{\left[A^2 + \left\{\frac{2\pi}{\lambda}(K - \cos\theta)\right\}^2\right]} \quad (4)$$

the zeros of this would be given by $$\cos\left[\frac{2\pi L}{\lambda}(K - \cos\theta)\right] = \frac{1 + e^{-2AL}}{2e^{AL}} \quad (5)$$

This means that there are no true zeros since the right-hand side of Equation 5 is greater than 1. This makes it advisable when feeding such a slot antenna system to excite the guide or inject the signal at a number of points along the guide as in Figure 7b to keep the radiated power level from each slot approximately equal. Alternatively, the antenna system may comprise a plurality of short lengths of guide placed end to end in alignment along the runway shown in dotted line form in Figure 7b, and having upper surfaces which are flush with the runway surface. Means are provided for exciting the short guides in parallel.

In another alternative the sizes of the apertures may be varied from slot to slot, for example, by varying the length $l$ of the slots 14, in a manner easily determined experimentally to result in an equal power radiation from each slot. Otherwise in the absence of these corrective measures the radiation diagram will have no sharp zeros such as are useful in course definition.

Figures 8 and 9 show the radiation field distribution obtained by means of Formula 2 for different radiation length L of the guide, the conditions being so selected as to give suitable glide path patterns.

Figure 10 shows the radiation field distribution obtained with damping computed according to Formula 4 for different degrees of damping and shows the absence of zero field at any angles of inclination. This shows the importance of maintaining a substantially equal radiation per slot of the wave guide.

Figure 8:
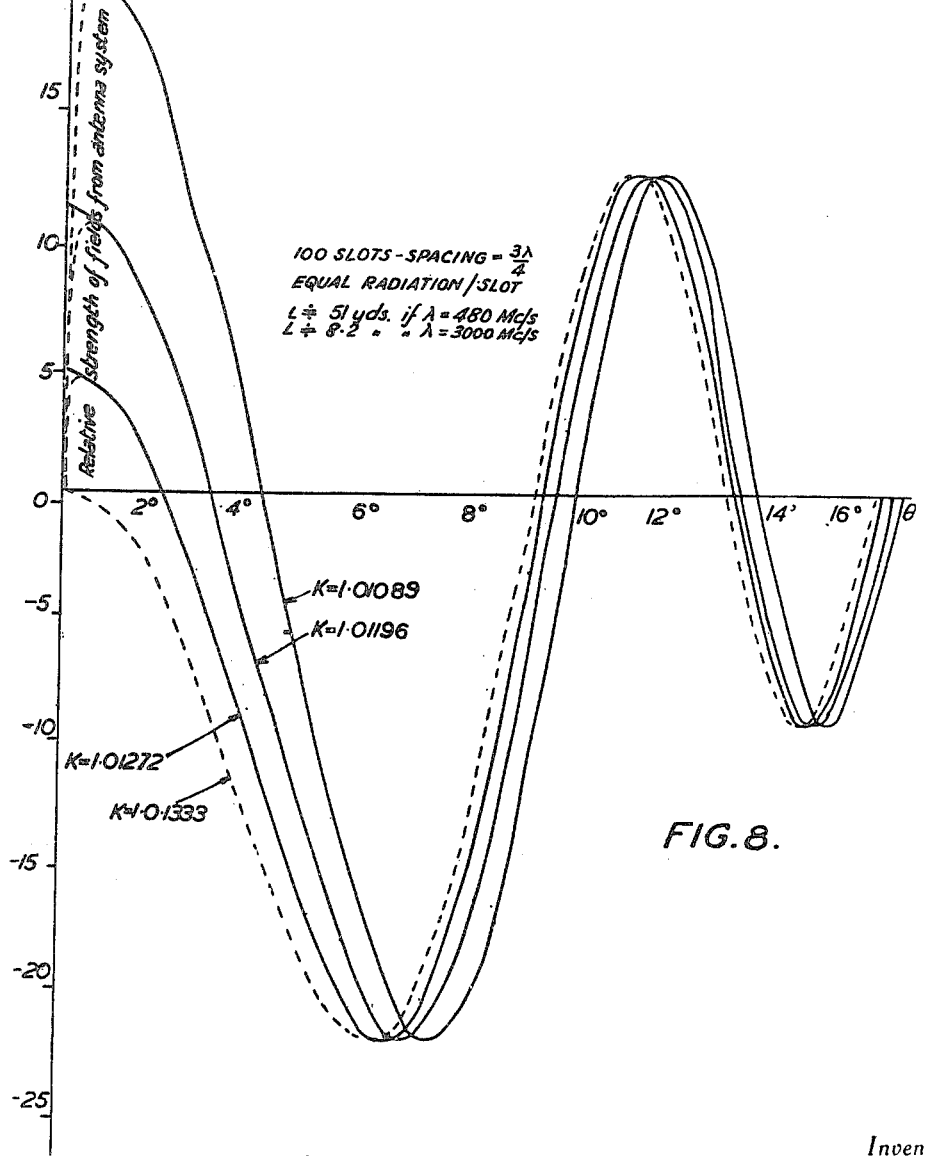

It should be observed that in the computed patterns of Figures 8, 9 and 10 the radiation intensity at zero degrees elevation as computed does not exist in practice since it is destroyed by the upper conductive surface of the guide. This has no material effect on the glide path patterns and provided the conducting surface is extended for some distance beyond the slots, this type of antenna system is practically independent of ground effects, which result in one of the pronounced disadvantages of the use of a dipole raised from the ground as a method of obtaining an extremely narrow low lying lobe.

Figure 7B:
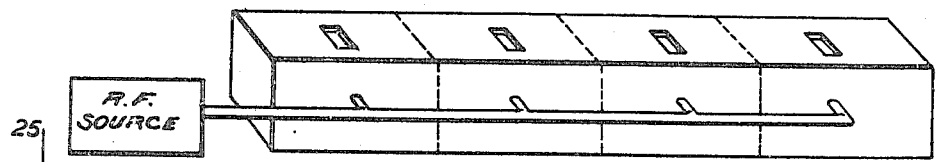

Referring to the diagrams of Figures 8 and 9, these are respectively for two antenna systems as shown in Figure 7 with slot spacing $$3\frac{\lambda}{4}$$

for illustration (a conveniently large spacing which gives a good front to back radiation ratio), and it would appear that the 100 slot system (Figure 8) is particularly suited for ultra short waves.

The length is not excessive for a normal bomber runway of several thousand yards, while it is even likely that frequencies 3000 mc./s. per second would enable a suitable glide path for landing on an aircraft carrier to be possible.

Whilst some types of antennae systems have been specifically referred to, others may be used in carrying out the present invention.

Whilst no specific means have been described for varying the shape of the field distribution patterns of the two antennae systems located above ground, such means depend on the particular systems used, and are well known to those versed in the art.

What is claimed is:

1. A radio glide path system for aircraft of the kind in which the glide path is defined on the aircraft by a constant field or signal strength relationship of two field strength patterns overlapping in a vertical plane comprising two antenna systems for producing said overlapping pattern said antenna systems being spaced apart in the direction of the glide path, said antenna systems being oriented with relation to each other in the direction of said glide path in relation to ground to cause the path of constant field or signal relationships of the overlapping patterns to commence in a substantially horizontal direction at a point in front of the said antenna systems as regards the landing aircraft.

2. A radio glide path system for aircraft of the kind in which the glide path is defined on the aircraft by a constant field or signal strength relationship of two field strength patterns overlapping in a vertical plane comprising a forward and a rear as regards the arriving aircraft antenna system spaced apart in the direction of the runway or glide path, and located above ground, at least the forward antenna system being offset from the runway, said antenna systems having respective directive lobes angularly related in said vertical plane and the lobe of the forward antenna system having a decreasing field strength with decreasing glide angle, to define a resultant glide path which is substantially horizontal for a predetermined distance in advance of one of said antenna systems.

3. A radio glide path system as claimed in claim 2 wherein said forward antenna system comprises a parabolic reflector and linear antenna, located above the ground at a height equal to the height of the aircraft receiving antenna when the aircraft is grounded.

4. A radio glide path system as claimed in claim 2 said rear antenna system having an increasing field with decreasing glide angle.

5. A radio glide path system for aircraft of the kind in which the glide path is defined on the aircraft by a constant field or signal strength relationship of two field strength patterns overlapping in a vertical plane, comprising two antenna systems spaced apart in the direction of the glide path and both flush with the ground level, and having respective directive lobes angularly related in said vertical plane, the lobe of the rear (as regards the arriving aircraft) antenna system having a decreasing field with decreasing glide angle, to define a resultant glide path which is substantially horizontal for a predetermined distance corresponding to the level-off distance for the aircraft.

6. A radio glide path system as claimed in claim 5, said forward antenna having an increasing field with decreasing glide angle.

7. A radio glide path system as claimed in claim 5 including an antenna system comprising a length of wave guide placed with its longitudinal axis parallel with the runway and provided in its interior with an exciting antenna at one end, and a plurality of radiating slots spaced along the length of the guide in the upper surface thereof.

8. A radio glide path system as claimed in claim 5 including an antenna system comprising a length of rectangular wave guide placed with its longitudinal axis parallel with the runway and its upper surface flush with the runway surface, and provided in its interior with a horizontal linear antenna at one end and a plurality of transverse radiating slots spaced along the length of the guide in the upper surface thereof.

9. A radio glide path system as claimed in claim 5 including an antenna system comprising a length of rectangular wave guide placed with its longitudinal axis parallel with the runway and its upper surface flush with the runway surface and provided with a plurality of radiating slots spaced along the length of the guide in the upper surface thereof and a plurality of exciting antenna within the guide and at different points along the length of the guide to maintain the power radiated from each slot substantially equal.

10. A radio glide path system as claimed in claim 5 including an antenna system comprising a plurality of short rectangular wave guides having radiating apertures in their upper surfaces, said guides being placed end to end in alignment along the runway with the surfaces containing said radiating apertures flush with the runway surface, and means for exciting said guides in parallel.

11. A radio glide path system for aircraft and of the kind in which the glide path is identified on the aircraft by a constant field or signal strength relationship of two demarcated radiation regions overlapping in a vertical plane, comprising two antenna systems spaced apart in the direction of the glide path and both substantially flush with the ground level each of said regions having respective directive lobes angularly overlapped in said vertical plane, the lobe of the radiation region produced by the rear antenna, as regards the approaching aircraft, having decreasing field strength with decreasing glide angle to define a glide path portion which is substantially horizontal for a predetermined distance corresponding to the desired leveling-off distance of the aircraft, and one of said antenna systems comprises a wave guide disposed with its longitudinal axis parallel with the runway and having its interior excited with radiations from an antenna at one end of the wave guide, said wave guide having a plurality of radiating slots spaced along the length of the guide in the upper surface thereof for the purpose set forth.

12. A radio glide path system as claimed in claim 2 wherein said forward antenna system comprises a horn radiator located above the ground at a corresponding height to the aircraft receiving antenna when the aircraft is grounded.

ERIC OSBORNE WILLOUGHBY.

REFERENCES CITED

The following references are of record in the file of this patent:

UNITED STATES PATENTS

| Number | Name | Date |
| --- | --- | --- |
| 2,165,256 | Hansell | July 11, 1939 |
| 2,272,997 | Alford | Feb. 10, 1942 |